United States Patent
Shirai et al.

(10) Patent No.: US 6,823,145 B1
(45) Date of Patent: Nov. 23, 2004

(54) OPTICAL TRANSMITTER MODULE

(75) Inventors: Masataka Shirai, Higashimurayama (JP); Minoru Fujita, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 646 days.

(21) Appl. No.: 09/630,147

(22) Filed: Jul. 31, 2000

(30) Foreign Application Priority Data

Mar. 10, 2000 (JP) .................................. 2000-072451

(51) Int. Cl.[7] .............................................. H04B 10/04

(52) U.S. Cl. .................. 398/182; 398/183; 398/187; 398/192; 398/194; 398/200; 359/248; 359/254; 359/246; 359/247; 359/237; 359/238; 385/2; 385/8; 385/14; 372/33; 372/38

(58) Field of Search .............................. 398/192, 182, 398/183, 194, 200, 187, 245; 359/248, 254, 247, 246, 237, 238; 385/14, 2, 8; 372/38, 33

(56) References Cited

U.S. PATENT DOCUMENTS

| 5,602,672 A | * | 2/1997 | Ishimura et al. ............. 359/245 |
| 5,793,516 A | * | 8/1998 | Mayer et al. ................ 359/245 |
| 6,057,954 A | * | 5/2000 | Parayanthal et al. ......... 359/248 |
| 6,323,986 B1 | * | 11/2001 | Lee et al. .................... 359/248 |

* cited by examiner

*Primary Examiner*—Hanh Phan
(74) *Attorney, Agent, or Firm*—Antonelli, Terry, Stout & Kraus, LLP

(57) ABSTRACT

In order to obtain an optical transmitter module for converting an input electric signal to a light signal with fidelity and outputting it therefrom, a terminal resistor Rt and an optical modulator MD are connected in parallel within a package including a laser diode with a monolithically integrated optical modulator for obtaining the light signal according to the electric signal. One thereof is grounded and the other thereof is connected to a wire inductance (L1) and an impedance matching resistor Rd in series with this parallel connection. Further, a high frequency transmission line (micro-strip line) MSL for the transmission of the electric signal is connected to the other end of the impedance matching resistor Rd.

22 Claims, 8 Drawing Sheets

FIG.4
| CIRCUIT TYPE | RETURN LOSS(AVE.) | DEVIATION IN BAND WIDTH(MIN.) | DEVIATION IN BAND WIDTH(MAX.) |
|---|---|---|---|
| I-A | ○(−16.4 dB) | ○(0 dB) | ○(0.1 dB) |
| I-B | △(−15.0 dB) | ○(0 dB) | ○(0.1 dB) |
| I-C | △(−14.25 dB) | △(1.2 dB) | ×(2.9 dB) |
| I-D | ○(−16.3 dB) | △(1.6 dB) | ×(3.3 dB) |
FIG.5A
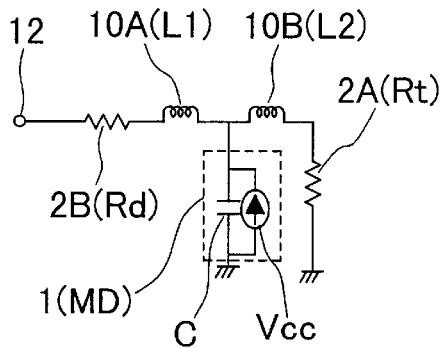
FIG.5B
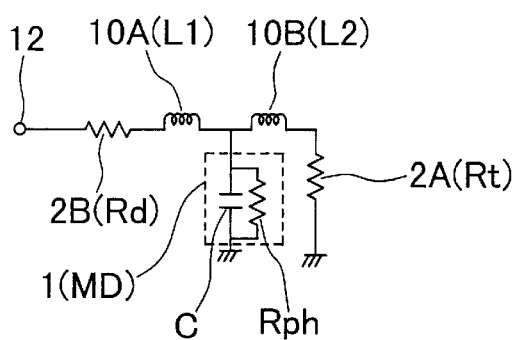
FIG.6
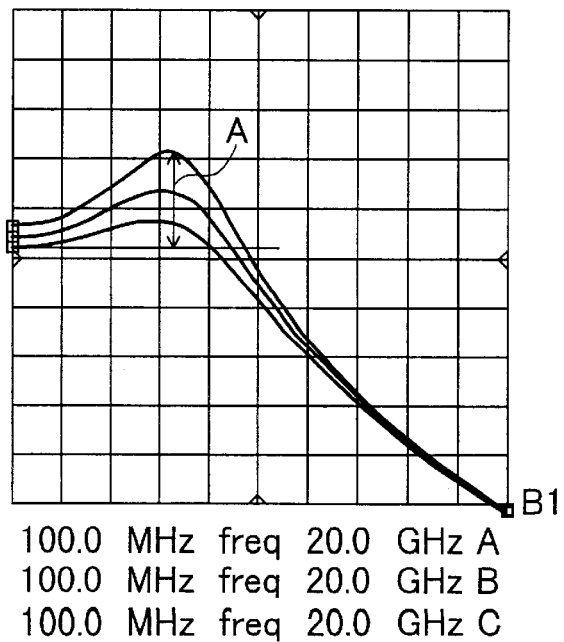
```
100.0 MHz  freq  20.0 GHz A
100.0 MHz  freq  20.0 GHz B
100.0 MHz  freq  20.0 GHz C
```

OPTICAL SIGNAL

ELECTRICAL SIGNAL

OPTICAL TRANSMITTER MODULE

BACKGROUND OF THE INVENTION

1. Field of the Invention

The present invention relates to an optical transmitter module suitable for use in optical fiber communications and equipped with an electricabsorption type optical modulator for converting an electric signal to a light signal, and particularly to a circuit configuration of an optical transmitter module suitable for use in optical communications, which requires a satisfactory high frequency characteristic.

2. Description of the Related Art

As a prior art of a laser diode module equipped with an electricabsorption type optical modulator, such a configuration as shown in FIG. 10A has been disclosed in Japanese Published Unexamined Patent Application No. Hei 9-252164. In a hermetic package having an electric signal input terminal, there are provided a micro-strip line 3 connected to its corresponding signal pin 12 of the hermetic package 8, a damping resistor (Rd) 2B having one end electrically connected to the micro-strip line 3 and the other end electrically connected to a terminal resistor (Rt) 2A, a modulator unit (hereinafter called "optical modulator" (MD)) 1 of a laser diode with a monolithically integrated electricabsorption optical modulator, which is electrically connected in parallel to the terminal resistor 2A, and an optical system for coupling the output of the optical modulator 1 to an optical fiber 9. These circuit configurations are formed over a sub-carrier 11 comprised of an insulator such as AlN. The sub-carrier 11 is further fixed to a carrier 6 and electrically grounded. Furthermore, a photodiode for optical power control 5 is fixed onto the carrier 6. A Peltier element used for cooling and a temperature monitoring thermistor 7 are also provided within the hermetic package.

FIG. 10B is a top view showing the sub-carrier 11 in a developed form. The laser diode 1 is fixed onto a grounding electrode pattern 13. The strip line 3, the terminal resistor 2A and the damping resistor 2B are also formed by evaporating a metal thin film onto the sub-carrier.

In the prior art, the optical modulator 1 is defined as being capable of being described by a capacitance component alone, and the impedance of the optical modulator 1 is reduced with respect to a high frequency input electric signal. Therefore, the damping resistor 2B is inserted into the package to thereby reduce impedance mismatching at a high frequency and lessen a return loss. The reduction in impedance mismatching at the high frequency is achieved even by connecting the damping resistor (Rd) in parallel with the terminal resistor (Rt) as in the case of a configuration example shown in FIG. 12 (circuit example shown in FIG. 13).

Originally, lessening the return loss in the input electric signal of the optical transmitter module is a technique extremely important for the purpose of accurately converting the waveform of the input electric signal to the waveform of a light signal. It is therefore necessary to accurately describe an equivalent circuit of the optical transmitter module including the optical modulator 1. The known reference referred to above discloses that the optical modulator 1 can be described by the capacitance component alone as mentioned above. However, the equivalent circuit of the optical modulator 1 cannot be essentially described by capacitance alone. It is necessary to describe a photo-carrier generated upon light absorption in the form of an equivalent circuit.

FIG. 5A is an equivalent circuit described in consideration of a photo-carrier generated upon light absorption. As shown in the same drawing, the equivalent circuit can be described by connecting a voltage depend current source in parallel with a capacitor. Further, the voltage depend current source can approximately be replaced by a resistor as shown in FIG. 5B. At this time, the amount of a reduction in the impedance of the modulator unit changes according to the magnitude of an amount-of-change ratio (=1/Rph) of a current bearing a photo-carrier to a voltage applied across the modulator. When the intensity of light inputted to the modulator actually increases, the present ratio, i.e., Rph becomes small, thereby leading to a large reduction in impedance. Such a reduction in impedance due to the photo-current becomes pronounced from a relatively low frequency domain. Therefore, the prior art is accompanied by a problem that the return loss increases due to the above-described impedance mismatching from the low frequency, so that the waveform of the electric signal is not converted to the waveform of the light signal with fidelity.

Further, the characteristic of a response to a light signal from an electric signal greatly varies within a band width in such a conventional configuration as shown in FIG. 11. This is because resonance occurs due to a capacitance component included in an optical modulator and an inductance component included in a wire and hence peaking occurs in response as shown in FIG. 6. The horizontal axis of FIG. 6 indicates the frequency of an input electric signal and the vertical axis thereof indicates an optical output response, respectively. Curves in the same drawing, each of which is indicative of the relationship between the input electric signal and the light output signal, differ in shape according to the intensity of light inputted to the optical modulator as in the case of three curves illustrated in the same drawing, for example. Further, A in the same drawing indicates a deviation in band width. The deviation in band width means the rate of change in optical output response within a required band width. The more the deviation in band width becomes large, the more distortion of the waveform of the light output signal increases. FIG. 7 shows an example of a waveform of a light signal outputted from a module having such a large deviation in band width. The present example shows the result of simulation at the time that an ideal rectangular wave is inputted as an input electric signal. The horizontal axis in FIG. 7 indicates time, and the vertical axis indicates the intensity of light, respectively. If an optical output response to the frequency of the input electric signal is constant, then the input rectangular wave is to be outputted as a light signal as it is. However, projection like distortion occurs in the output light signal according to the deviation in band width in FIG. 6 as is understood from FIG. 7. Further, the projection like distortion is large as the deviation in band width increases. Thus, the prior art is accompanied by a problem that a satisfactory light-signal waveform cannot be obtained with an increase in the deviation in band width.

SUMMARY OF THE INVENTION

An object of the present invention is to implement an optical transmitter module which solves the foregoing problems and is equipped with an optical modulator less reduced in impedance, which converts the waveform of an input electric signal to the waveform of an output light signal with fidelity, and by extension an optical transmitter module having a satisfactory high frequency characteristic, wherein even if the power of light inputted to an optical modulator changes, the waveform of a light signal is not distorted, i.e., the characteristic of a response to the light signal is not degraded.

Another object of the present invention is to implement an optical transmitter module which solves the above-described problems and is equipped with an optical modulator which provides a small deviation in band width and is hard to develop peaking in response, and which is capable of obtaining a satisfactory light-signal waveform.

In order to achieve the above objects, the present invention principally comprises an optical transmitter module which comprises an electricabsorption type optical modulator for modulating a light signal in response to an electric signal, a first resistor having one end connected to the optical modulator and the other end grounded, and a second resistor having one end connected to an input supplied with the electric signal and the other end connected to the optical modulator and the first resistor respectively, and wherein the second resistor and the optical modulator are connected to each other through a first inductance.

The optical transmitter module may include a high frequency line connected to the second resistor and for transferring the electric signal to the optical modulator.

The optical modulator and the first resistor may be connected to each other through a second inductance different from the first inductance. The optical modulator may be integrated into a semiconductor laser diode.

At least the optical modulator, the first resistor, the second resistor and the first inductance may be held in one package. In that case, the electric signal may be supplied from outside the package. Alternatively, the electric signal may be generated inside the package.

The value of the second resistor may range from over 3 Ω to under 25 Ω. Alternatively, the value of the first inductance may be set greater than or equal to 0.1 nH. Alternatively, the distance between the second resistor and the optical modulator may be set so as to be less than or equal to 7.5 mm.

The optical transmitter module is equipped with a first substrate, and a second substrate electrically isolated from the first substrate. The optical transmitter module may take a configuration wherein at least the optical modulator and the first resistor are provided over the first substrate, and at least the second resistor is provided over the second substrate.

The optical transmitter module is equipped with a first substrate, and a second substrate electrically isolated from the first substrate. The optical transmitter module may take a configuration wherein at least the optical modulator and the first resistor are provided over the first substrate, and at least the high frequency line and the second resistor are provided over the second substrate.

The first resistor and the second resistor may be placed on the sides opposite to each other with the optical modulator interposed therebetween.

The above, other objects and novel features of the present invention will become apparent from the description of the present specification and the accompanying drawing.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 4 is a diagram for performing a comparison between high frequency characteristics based on circuit configurations;

FIGS. 5A and 5B are respectively equivalent circuit diagrams of optical transmitter modules according to the present invention, which have been taken into consideration photo-carriers;

FIG. 6 is a diagram showing an example of a high frequency response in which a deviation in band width is large;

DETAILED DESCRIPTION OF THE PREFERRED EMBODIMENTS

Preferred embodiments of the present invention will hereinafter be described in detail with reference to the accompanying drawings.

Figure 2:
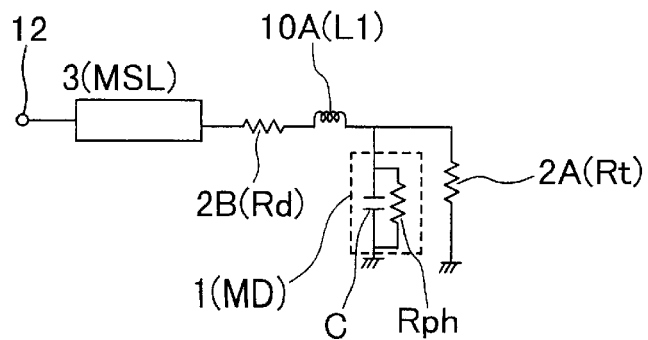
FIG. 2 is an equivalent circuit diagram of the basic configuration of the optical transmitter module according to the present invention.

FIG. 2 is an equivalent circuit diagram showing a basic configuration of an optical transmitter module according to the present invention. In the present invention, a resistor Rd for compensating for a reduction in impedance at a low frequency of a modulator unit (in which a modulator and a terminal resistor are connected in parallel), which occurs due to a photo-current incident to optical absorption, is included. Further, an inductance L1 is connected to the resistor Rd to compensate for the impedance of the modulator unit, which is lowered at a high frequency, by connecting the inductance in series with the resistor Rd. Incidentally, since the impedance of L1 increases in proportion to the frequency, it is useful for impedance matching at a high frequency.

Figure 3:
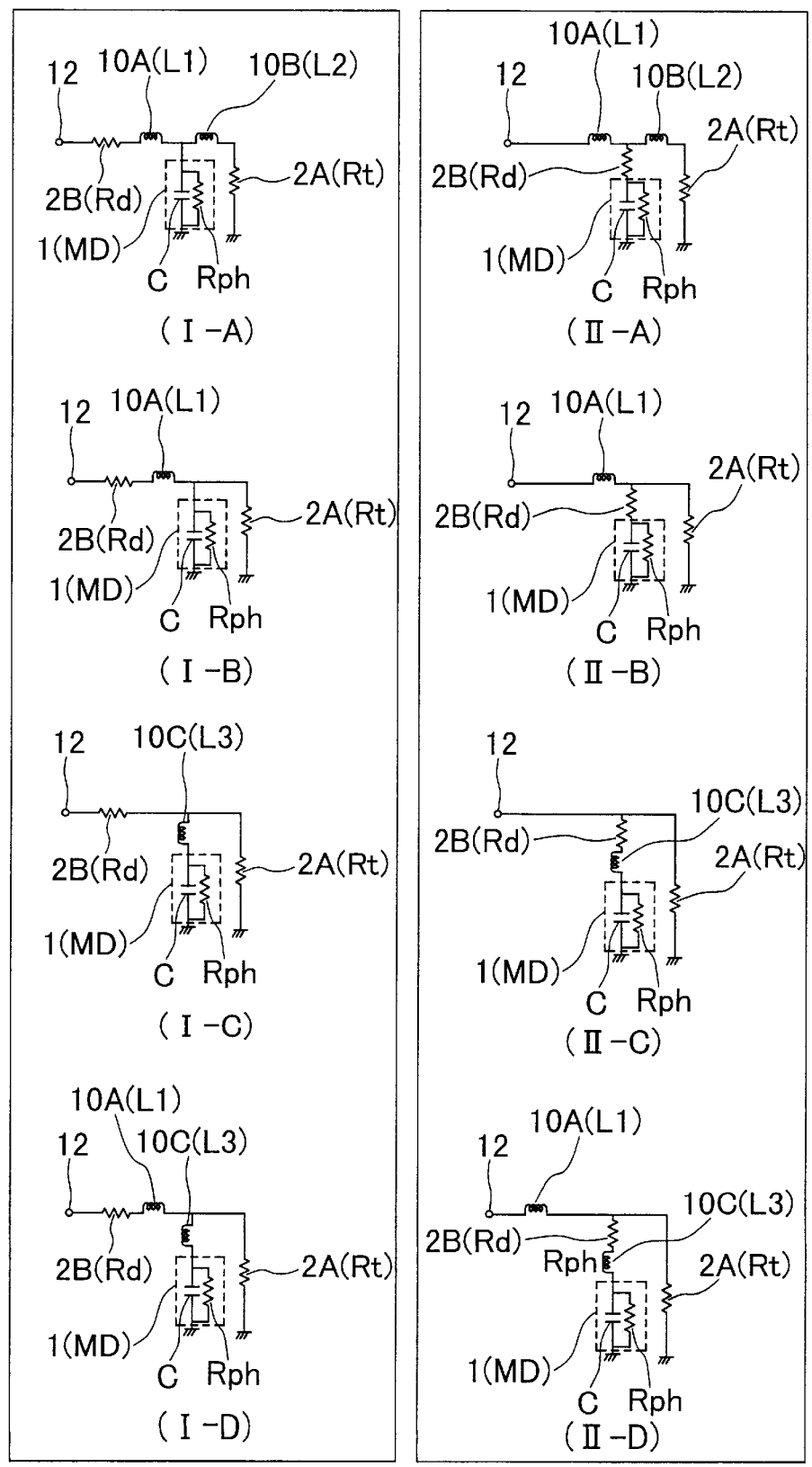
FIG. 3 is a diagram illustrating circuit configuration patterns at the time that optical modulators are connected by wire bonding.
Figure 7:
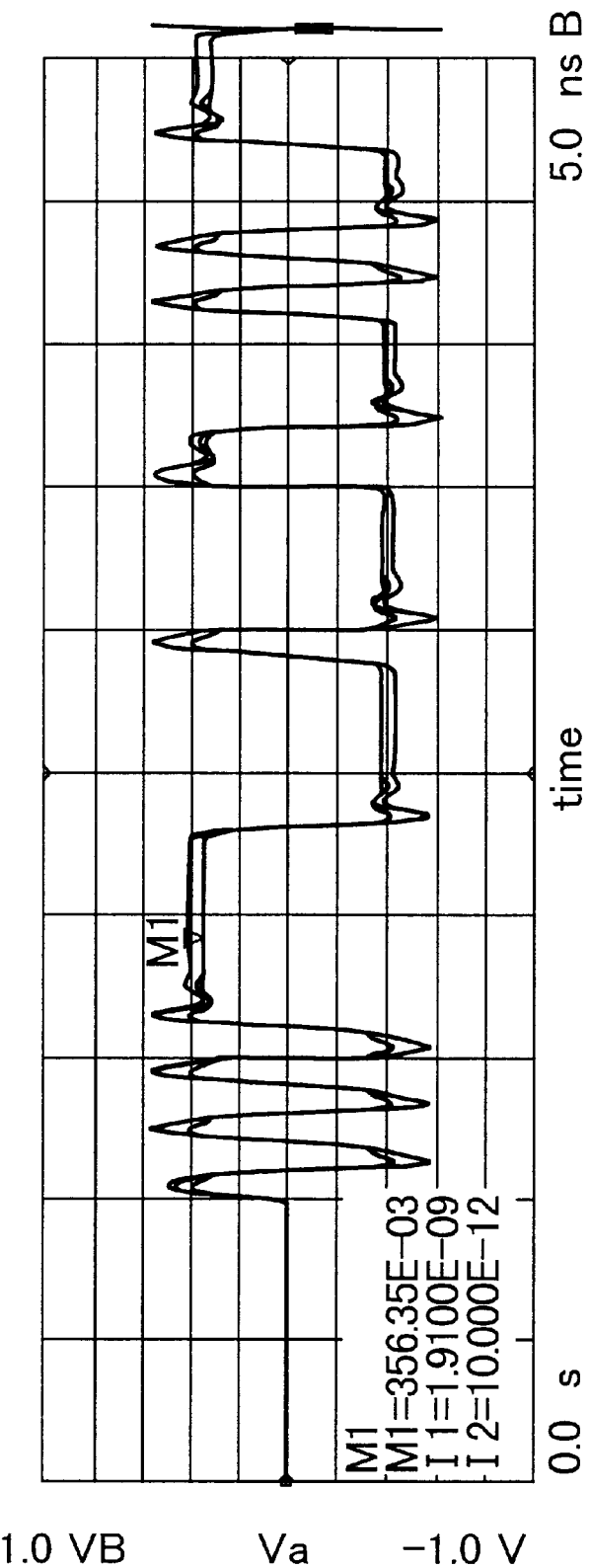
FIG. 7 is a diagram illustrating an example of a light waveform in which a deviation in band width is large.

FIG. 3 is a diagram showing circuit configuration patterns where optical modulators are connected by wire bonding. When wiring bonding having the advantage of simplicity in terms of implementation is used to form inductance and connect between optical modulators and high frequency transmission lines, the number of circuits substantially different in optical modulator, damping resistor (Rd), terminal resistor (Rt) and wire connecting method is eight types as shown in FIG. 3. It has experimentally been confirmed that Rph of these is reduced to about 50 Ω to 100 Ω. Load impedances of these circuits can be described as approximately A=Rd+Rt*Rph/(Rt+Rph) in a low frequency region or domain as to four types (I) in the same drawing. Load impedances can be described as B=Rt*(Rd+Rph)/(Rt+Rd+Rph)=Rt*Rph/(Rt+Rph+Rd)+Rt*Rd/(Rt+Rph+Rd) as to four types (II) in the same drawing. If A>B, then the effect of greatly improving impedance matching is generally obtained even by the insertion of a damping resistor low in resistance. Inserting a very large damping resistor might exert a bad influence on an extinction ratio and a chirping characteristic of each optical modulator, thus making it impossible to transmit light over a long transmission distance. Therefore, the four types (II) are considered to be poor in feasibility. Thus, numerical values have been analyzed with objects being limited to the circuit configurations of the four types (I).

Figure 11:
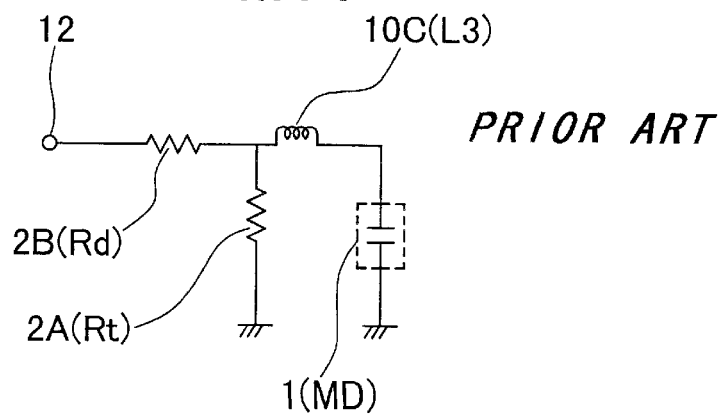
FIG. 11 is an equivalent circuit diagram of the first prior art.
Figure 13:
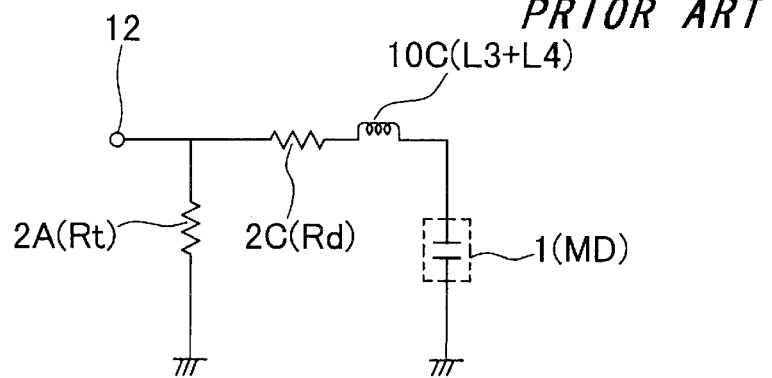
FIG. 13 is an equivalent circuit diagram of the second prior art.

FIG. 4 shows the result of their analyses. Of the four types (I), return losses and deviations in band width were calculated and compared in consideration of even the influence of wire's inductance. It was thus confirmed that the configurations of the present invention would be substantially superior to other configurations in these characteristics as shown in FIG. 4. Now, I-A and I-B correspond to the circuit configurations of the present invention respectively. I-C shows a circuit configuration of the first prior art shown in FIG. 11, and I-D is basically identical to a circuit configuration of the second prior art shown in FIG. 13. The following parameters were used upon calculation of the present table. L1=0.7 nH, L2=0.7 nH, L3=0.6 nH, C=0.6 pF, Rt=50 Ω, and Rd=15 Ω respectively. Rph was changed in parameter within a range of 50 Ω to 100 Ω. The means of return losses and the maximum and minimum of a deviation in band width have taken the means and the maximum and minimum with respect to Rph respectively. Further, the relationship between superiority and inferiority shown in FIG. 4 no changes within parameter ranges of at least L1, L2 and L3=0.2 nH to 1.0 nH, C=0.4 pF to 1.0 pF, Rt=50 Ω to 70 Ω and Rd=3 Ω to 25 Ω. Thus, it became evident that the configurations of I-A and I-B were effective and most suitable for improving return losses and deviations in band width to be set as targets as methods of connecting the damping resistor (Rd), terminal resistor (Rt), the capacitance (C) of an optical modulator, Rph based on a photo-current, and inductances (L1, L2 and L3) for wire boding. Described specifically, the present configurations could obtain a 39% improvement in return loss and a 48% improvement in deviation in band width as compared with the configuration (I-C) of the first prior art.

FIG. 1 is a view showing a first embodiment of an optical transmitter module according to the present invention. A semiconductor laser diode with a monolithically integrated optical modulator 31 is placed over an AlN-made sub-carrier 32. Further, the sub-carrier 32 is fixed to a carrier 33 by solder. Furthermore, the carrier 33 is placed over a Peltier cooler 34 and accommodated within a metal storage or holding case 35.

Figure 1A:
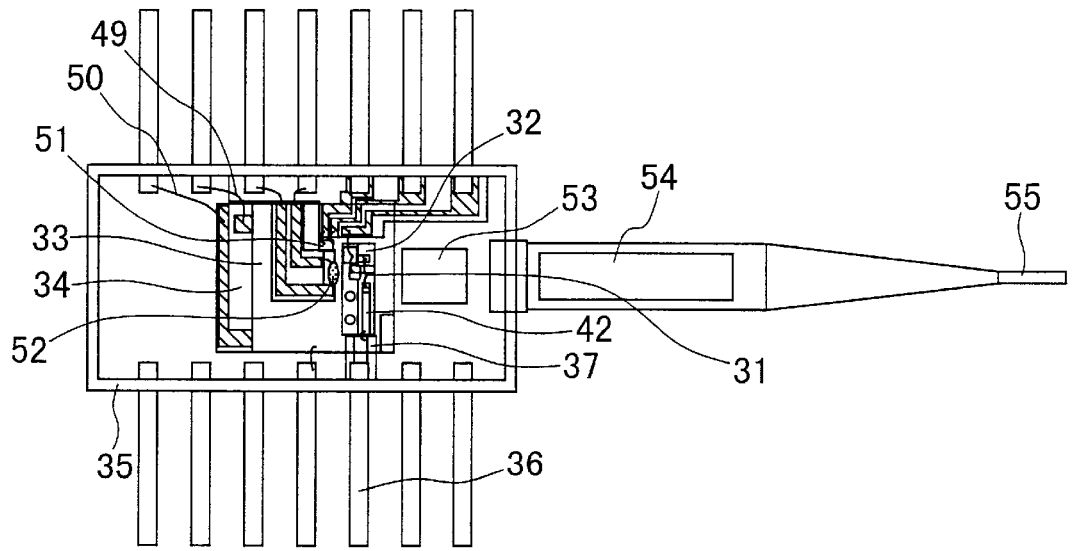
FIGS. 1A and 1B are respectively a module overall view showing a basic configuration of an optical transmitter module according to the present invention and a top view of a sub-carrier thereof.
Figure 1B:
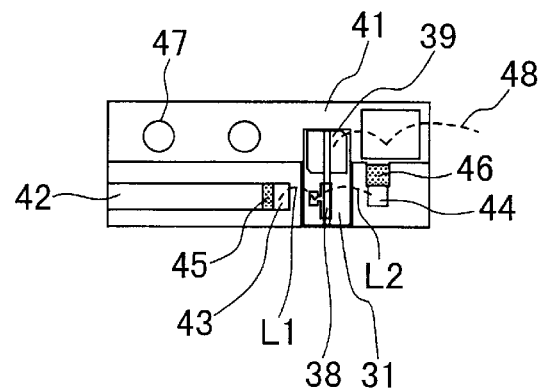

FIG. 2 is a top view of the sub carrier 32. A laser oscillator and an optical modulator are integrated into a semiconductor laser diode 31. An electrode (electrode of optical modulator) 38 to which a high frequency modulation signal is inputted, and an electrode 39 to which a laser oscillation voltage is applied, are provided on the upper surface side of a laser chip 31. There is further provided a grounding electrode 40 on the lower surface side of the chip 31. A grounding electrode pattern 41, a first micro-strip line 42 for transferring an input electric signal, wire bonding regions or areas 43 and 44, an impedance controlling resistor (damping resistor) 45, and a terminal resistor 46 are formed over the sub-carrier by a metal thin film. Further, a grounding electrode is provided even over the reverse side or back of the sub-carrier 32, and fixed to the carrier 33 made of CuW and grounded. The grounding electrode is electrically connected to the back thereof by defining holes 47 in AlN. As shown in FIGS. 1A and 1B, a series connection of the terminal resistor 46 and a wire inductance (L2), and the electrode of the optical modulator 38 are connected in parallel. One thereof is grounded and the other is connected to the wire inductance (L1) and the impedance controlling resistor in series with the parallel connection.

The input electric signal is supplied to each of terminals 36. Each of leads shielded by an insulator extends through side walls of the holding case 35. The lead is connected to a second micro-strip line 37 formed over the AlN by solder. The input electric signal is transferred to the first micro-strip line 42 placed on the sub-carrier 32 through the second micro-strip line 37, whereby the optical modulator 38 is driven.

The carrier 33 having such a high frequency circuit is placed over the Peltier cooler 34. Further, the Peltier cooler 34 is fixed to the bottom of the holding case 35. When a predetermined current is supplied via leads 49 and 50 of the Peltier cooler 34, the absorption of heat occurs on the upper side of the Peltier cooler 34, so that the sub-carrier 32 and semiconductor laser chip 31 on the carrier 33 can be cooled. While heat corresponding to the absorbed heat is generated on the lower side of the Peltier cooler 34 at this time, the heat is diverged into the outside through the case 35. Further, designated at numeral 51 in FIG. 1A is a thermistor which monitors the temperature through the use of a resistor and keeps a driving temperature of a laser constant.

Further, a wire 48 shown in FIG. 1B is a wire or interconnection for driving the laser at a constant optical output. Designated at numeral 52 in FIG. 1A is a photodiode, which monitors the intensity of light emitted from the side opposite to the modulator 38 of the laser chip to thereby keep the power of light outputted from the laser unit 39 constant. Reference numeral 53 indicates an aspherical lens used for fiber connection, reference numeral 54 indicates an isolator, and reference numeral 55 indicates a single mode fiber, respectively.

According to the present embodiment, an advantageous effect can be brought about in that an optical transmitter module for faithfully converting the waveform of an electric signal small in return loss to an optical signal waveform can be provided or offered.

Figure 8:
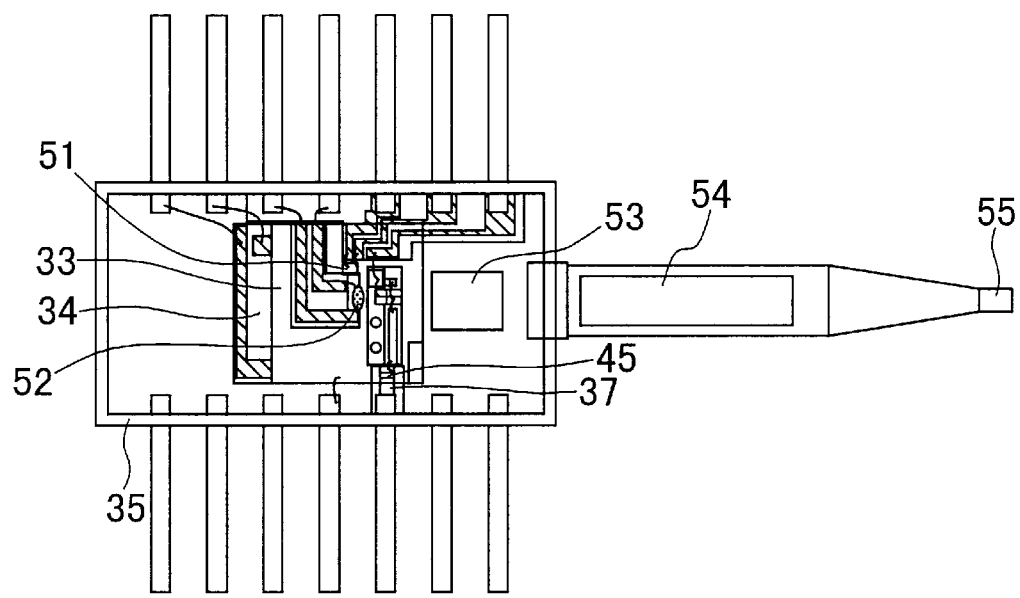
FIG. 8 is a configurational view of an optical transmitter module according to the present invention, wherein an impedance controlling resistor (damping resistor) is placed over another substrate.

FIG. 8 is a view showing a second embodiment of the present invention and is a view showing a a configuration of an optical transmitter module wherein an impedance controlling resistor (damping resistor) is mounted on another substrate. The same elements of structure as those employed in the first embodiment are identified by like reference numerals. The impedance controlling resistor is formed over a substrate different from that for a sub-carrier 32 with a laser chip 31 mounted thereon. Rph, the capacitance (C), an extinction ratio and a chirping characteristic of the laser chip 31 are measured in a state of being placed over the sub-carrier 32. Further, suitable resistance values are determined based on the result of measurement, and the resistor is integrated into the module shown in FIG. 8, whereby the configuration of the present embodiment can be obtained. An insulating substrate (SI substrate) can be used as another substrate referred to above.

Figure 12A:
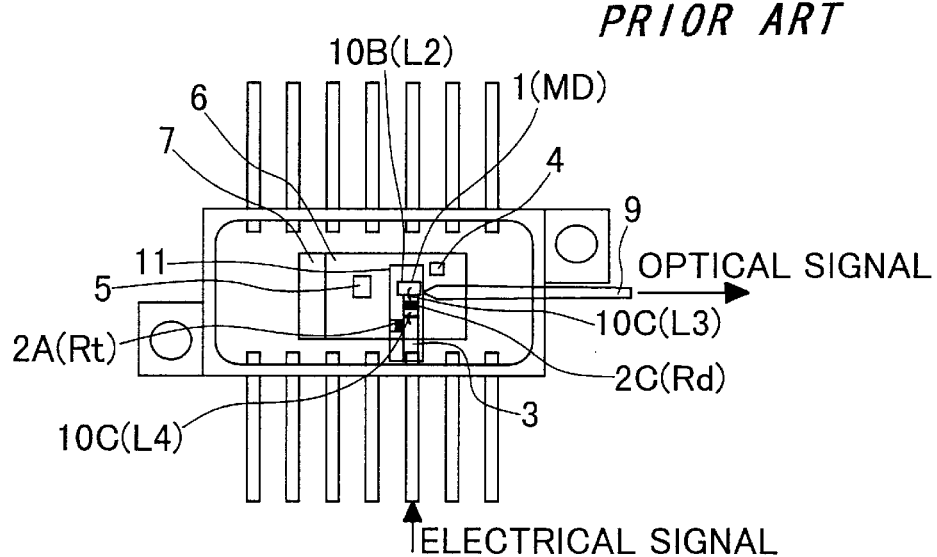
FIGS. 12A and 12B are respectively an overall configurational view of a module showing a second prior art and a top view of a sub-carrier thereof.
Figure 12B:
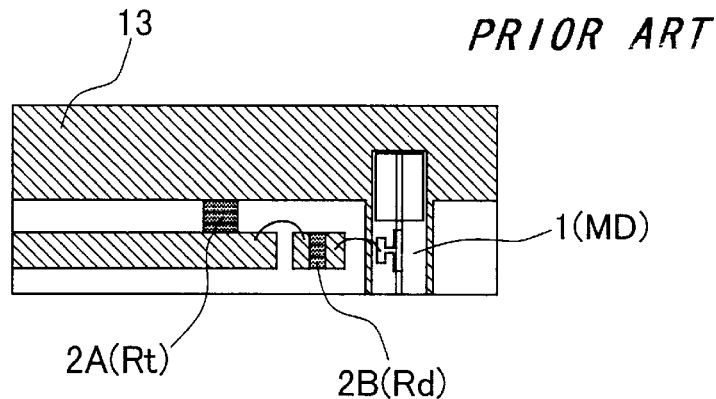

The impedance controlling resistor is formed over the substrate 37 different from that for the sub-carrier 32 equipped with the laser chip 31. Under this state, Rph, the capacitance (C), the extinction ratio and the chirping characteristic of the laser chip 31 are measured in the state of being placed over the sub-carrier 32, and the suitable resistance values are determined based on the resultant data. In this condition, Rd is wired by metal wires and integrated into the module as shown in FIG. 12B. It is thus possible to obtain a module which is inexpensive and has a satisfactory high frequency characteristic. Here, the sub-carrier 32 is fixed to a chip carrier 33 by solder. Further, the chip carrier 33 is mounted on a Peltier cooler 34 and held within a metal holding or storage case 35. A laser oscillator and an optical modulator are integrated into a semiconductor laser diode 31. An electrode (electrode of optical modulator) to which a high frequency modulation signal is inputted, and an electrode to which a laser oscillation voltage is applied, are provided on the upper surface side of the laser chip 31. There is further provided a grounding electrode on the lower surface side of the chip 31. A grounding electrode pattern, a first micro-strip line for transferring an input electric signal, wire bonding regions or areas, an impedance controlling resistor, and a terminal resistor are formed over the sub-carrier by a metal thin film. A grounding electrode is also provided even over the reverse side or back of the sub-carrier. The grounding electrode is fixed to the carrier 33 made of CuW and simultaneously grounded. Further, the grounding electrode is electrically connected to the back thereof by defining holes in AlN. Circuit configurations of these parts are represented as shown in FIG. 5A or 5B. Namely, a series connection of the terminal resistor and a wire inductance (L2), and the optical modulator are connected in parallel. One thereof is grounded and the other is connected to a wire inductance (L1) and the impedance controlling resistor in series with the parallel connection.

The input electric signal is supplied to each of terminals. Each of leads shielded by an insulator extends through side walls of the holding case 35. The lead is connected to a second micro-strip line 37 formed over the AlN by solder. The input electric signal is transferred to the first micro-strip line 42 placed on the sub-carrier 32 through the second micro-strip line 37, whereby the optical modulator is driven.

The carrier 33 having such a high frequency circuit is placed over the Peltier cooler 34. Further, the Peltier cooler 34 is fixed to the bottom of the holding case 35. When a predetermined current is supplied via leads of the Peltier cooler 34, the absorption of heat occurs on the upper side of the Peltier cooler 34, so that the sub-carrier 32 and semi-conductor laser chip 31 on the carrier 33 can be cooled. While heat corresponding to the absorbed heat is generated on the lower side of the Peltier cooler 34 at this time, the heat is diverged into the outside through the case 35.

Reference numeral 53 indicates an aspherical lens used for fiber connection, reference numeral 54 indicates an isolator, and reference numeral 55 indicates a single mode fiber, respectively.

According to the present embodiment, an advantageous effect can be brought about in that an optical transmitter module having a satisfactory high frequency characteristic can be implemented at low cost.

Figure 9:
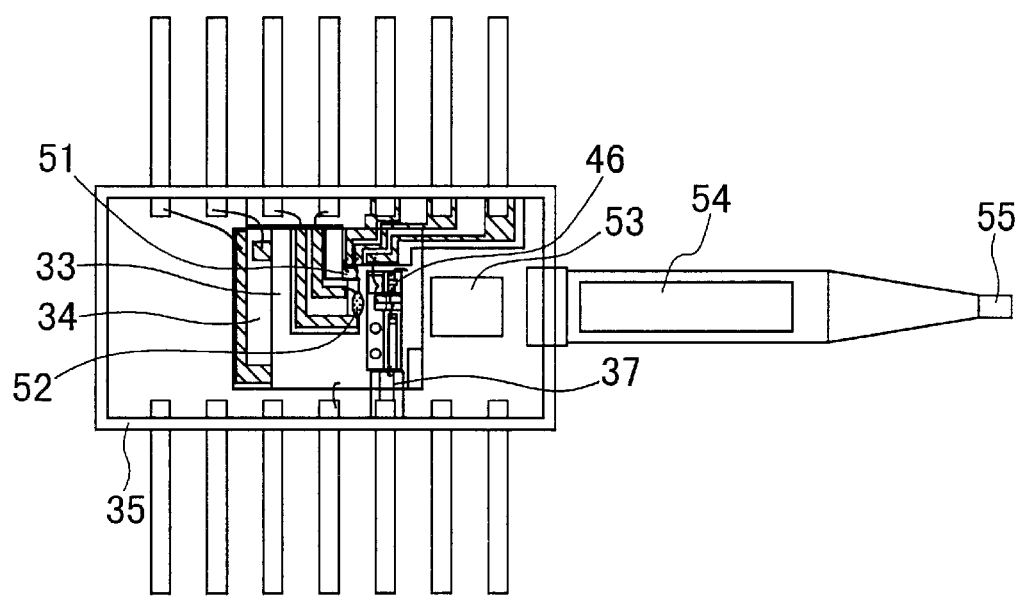
FIG. 9 is a configurational view of an optical transmitter module according to the present invention, wherein a terminal resistor is placed over another substrate.
Figure 10A:
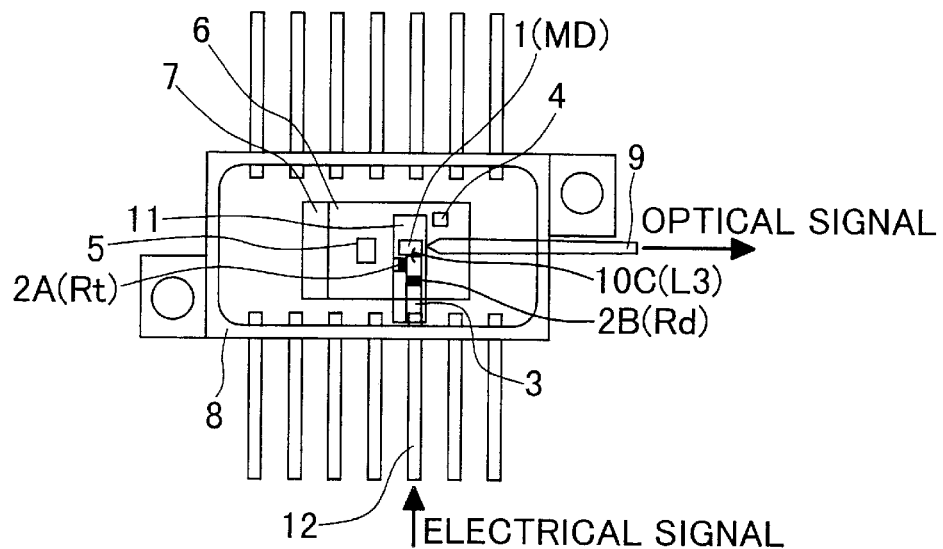
FIGS. 10A and 10B are respectively an overall configurational view of a module showing a first prior art and a top view of a sub-carrier thereof.
Figure 10B:
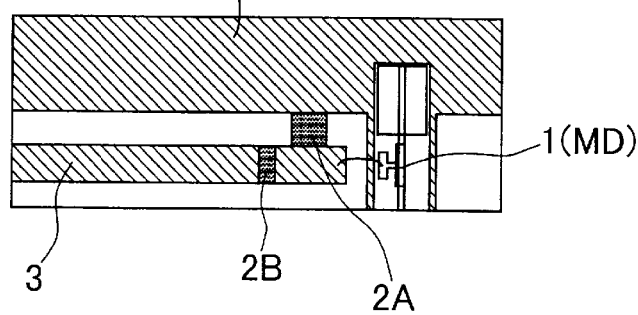

FIG. 9 is a view showing a third embodiment of the present invention and is a view illustrating a configuration of an optical transmitter module wherein a terminal resistor is placed on another substrate. The same elements of structure as those employed in the first embodiment are identified by the same reference numerals. In a manner similar to the second embodiment, the terminal resistor is formed over another substrate without being formed over a sub-carrier 32 as shown in FIG. 9 to thereby allow an adjustment to the terminal resistor. An insulating substrate (SI substrate) can be used as another substrate referred to above in a manner similar to the second embodiment.

As shown in FIG. 9 in a manner similar to the second embodiment, the terminal resistor is formed over another insulating substrate other than the sub-carrier 32 to thereby permit the adjustment to the terminal resistor, whereby a module is obtained which is inexpensive and has a satisfactory high frequency characteristic. Here, the sub-carrier 32 is fixed to a chip carrier 33 by solder. Further, the chip carrier 33 is mounted on a Peltier cooler 34 and held within a metal holding or storage case 35. A laser oscillator and an optical modulator are integrated into a semiconductor laser diode 31. An electrode (electrode of optical modulator) to which a high frequency modulation signal is inputted, and an electrode to which a laser oscillation voltage is applied, are provided on the upper surface side of the laser chip 31. There is further provided a grounding electrode on the lower surface side of the chip 31. A grounding electrode pattern, a first micro-strip line for transferring an input electric signal, wire bonding regions or areas, an impedance controlling resistor, and a terminal resistor are formed over the sub-carrier by a metal thin film. A grounding electrode is also provided even over the reverse side or back of the sub-carrier. The grounding electrode is fixed to the carrier 33 made of CuW and simultaneously grounded. Further, the grounding electrode is electrically connected to the back thereof by defining holes in AlN. Circuit configurations of these parts are given as shown in FIG. 5A or 5B. Namely, a series connection of the terminal resistor and a wire inductance (L2), and the optical modulator are connected in parallel. One thereof is grounded and the other is connected to a wire inductance (L1) and the impedance controlling resistor in series with the parallel connection.

The input electric signal is supplied to each of terminals. Each of leads shielded by an insulator extends through side walls of the holding case 35. The lead is connected to a second micro-strip line 37 formed over the AlN by solder. The input electric signal is transferred to the first micro-strip line 42 placed on the sub-carrier 32 through the second micro-strip line 37, whereby the optical modulator is driven.

The carrier 33 having such a high frequency circuit is placed over the Peltier cooler 34. Further, the Peltier cooler 34 is fixed to the bottom of the holding case 35. When a predetermined current is supplied via leads of the Peltier cooler 34, the absorption of heat occurs on the upper side of the Peltier cooler 34, so that the sub-carrier 32 and semi-conductor laser chip 31 on the carrier 33 can be cooled. While heat corresponding to the absorbed heat is generated on the lower side of the Peltier cooler 34 at this time, the heat is diverged into the outside through the case 35.

Reference numeral 53 indicates an aspherical lens used for fiber connection, reference numeral 54 indicates an isolator, and reference numeral 55 indicates a single mode fiber, respectively.

According to the present embodiment, an advantageous effect can be brought about in that a module having a satisfactory high frequency characteristic can be implemented at low cost.

Figure 14:
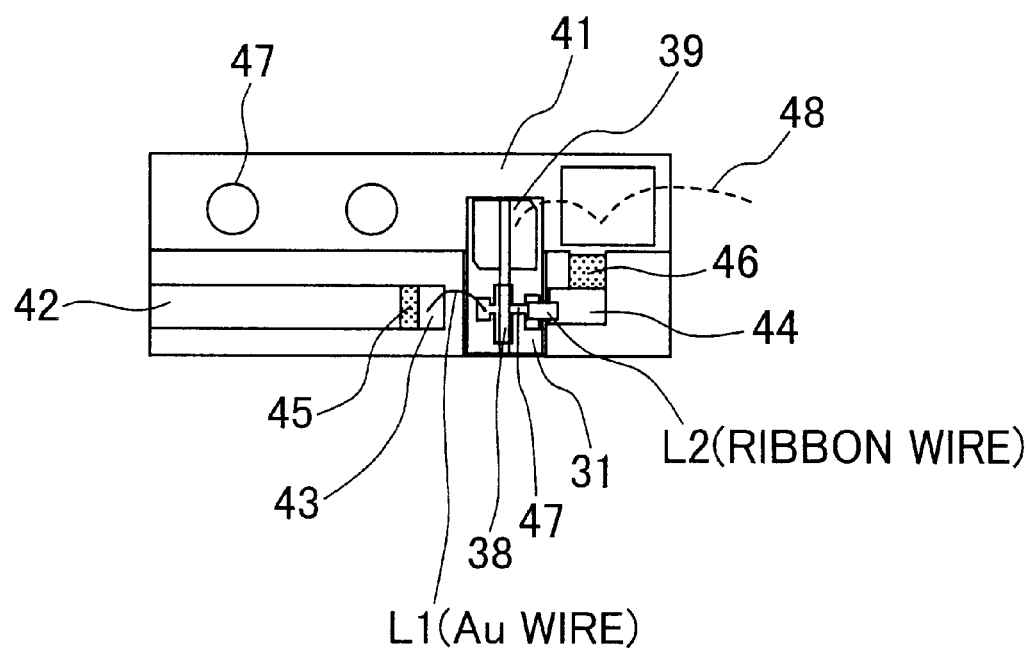
FIG. 14 is a top view showing a sub-carrier of an optical transmitter module according to a fourth embodiment of the present invention.

FIG. 14 is a view showing a fourth embodiment of the present invention and is a top view of a sub-carrier employed in one embodiment of an optical transmitter module of the circuit type (I-A (FIG. 3)). In the present embodiment, a gold wire and a ribbon wire are used as wire inductances (L1) and (L2) respectively. Other configurations in the module are similar to those employed in the first embodiment. The same elements of structure as those employed in the first embodiment are identified by the same reference numerals.

An electrode 38 (electrode of optical modulator) to which a high frequency modulation signal is inputted, and an electrode 39 to which a laser oscillation voltage is applied, are provided on the upper surface side of a laser chip 31. There is also provided a grounding electrode 40 on the lower surface side of the chip 31. Further, an electrode 47 for transferring a high frequency to a terminal resistor is provided over the chip and connected to the terminal resistor through the use of a ribbon wire (L2) having an inductance of 001 nH or less. Since the value of the inductance of the ribbon wire is small at this time, the influence thereof is low. This is not described on a circuit diagram. A grounding electrode pattern 41, a first micro-strip line 42 for transferring an input electric signal, wire bonding regions or areas 43 and 44, an impedance controlling resistor 45, and a terminal resistor 46 are formed over the sub-carrier by a metal thin film. A grounding electrode is also provided even over the reverse side or back of the sub-carrier. The grounding electrode is fixed to a carrier 33 made of CuW and simultaneously grounded. Further, the grounding electrode is electrically connected to the back thereof by defining holes 47 in AlN. Circuit configurations of these parts are given as shown in FIG. 6A or 6B. Namely, the terminal resistor 46 and the optical modulator 38 are connected in parallel. One thereof is grounded and the other is connected to a wire inductance (L1) and the impedance controlling resistor in series with this parallel connection.

According to the present embodiment, an advantageous effect can be brought about in that a module having a satisfactory high frequency characteristic can be implemented at low cost.

Incidentally, the present invention is not limited to the respective embodiments referred to above. It is needless to say that all sorts of changes can be made according to the difference between high frequency transfer characteristics. While, for example, AlN has been selected as a material for the sub-carrier in the above-described embodiment, the present invention is not limited to it. Other materials such as $AlO_3$, etc. can also be selected as the material. While the gold wire is used as an inductance element in the above-described embodiment, the present invention is not necessarily limited to it. It may be set as a wire or interconnection on a sub-carrier substrate.

According to the present invention, return losses can be reduced over a wide frequency range of from a low frequency domain to a high frequency domain in a transmitter module for optical communications. Even if an optical output is greatly changed, a satisfactory response characteristic in which a return loss in input electric signal is low, can be obtained, thus making it possible to offer or provide an optical transmitter module satisfactory in high frequency characteristic.

What is claimed is:

1. An optical transmitter module, comprising:
    an electro-absorption type optical modulator for modulating a light signal in response to an electric signal;
    a first resistor having one end connected to said optical modulator and the other end grounded; and
    a second resistor arranged to compensate for a reduction in impedance due to a photo-current incident, having one end connected to an input supplied with the electric signal through a micro-strip line, and the other end connected to a connecting point of said optical modulator and said one end of said first resistor respectively;
    wherein said second resistor and said optical modulator are connected to each other through a first inductance.

2. The optical transmitter module as claimed in claim 1, wherein said optical modulator and said first resistor are connected to each other through a second inductance different from the first inductance.

3. The optical transmitter module as claimed in claim 1, wherein at least said optical modulator, said first resistor, said second resistor and said first inductance are arranged in a single package.

4. The optical transmitter module as claimed in claim 3, wherein said electric signal is supplied from outside said package.

5. The optical transmitter module as claimed in claim 3, wherein said electric signal is generated inside said package.

6. The optical transmitter module as claimed in claim 1, wherein said optical modulator is integrated into a semiconductor laser diode.

7. The optical transmitter module as claimed in claim 1, wherein the value of said second resistor ranges from over 3 Ω to under 25 Ω.

8. The optical transmitter module as claimed in claim 1, wherein the value of said first inductance is greater than or equal 0.1 nH.

9. The optical transmitter module as claimed in claim 1, wherein the distance between said second resistor and said optical modulator is less than or equal to 7.5 mm.

10. The optical transmitter module as claimed in claim 1, further including a first substrate, and a second substrate electrically isolated from said first substrate, and wherein at least said optical modulator and said first resistor are provided over said first substrate, and at least said second resistor is provided over said second substrate.

11. The optical transmitter module as claimed in claim 1, wherein said first resistor and said second resistor are placed on sides opposite to each other with said optical modulator interposed therebetween.

12. An optical transmitter module, comprising:
    an electro-absorption type optical modulator for modulating a light signal in response to an electric signal;
    a high frequency line for transferring the electric signal to said optical modulator;
    a first resistor having one end connected to said optical modulator and the other end grounded; and
    a second resistor arranged to compensate for a reduction in impedance due to a photo-current incident, having one end connected to said high frequency line and the other end connected to a connecting point of said optical modulator and said one end of said first resistor respectively;
    wherein said second resistor and said optical modulator are connected to each other through a first inductance.

13. The optical transmitter module as claimed in claim 12, further including a first substrate, and a second substrate electrically isolated from said first substrate, and wherein at least said optical modulator and said second resistor are provided over said first substrate, and at least said first resistor is provided over said second substrate.

14. An optical communications module, comprising:
    a micro-strip line for transferring an input electric signal;

an electro-absorption type optical modulator coupled to receive the input electric signal, for modulating a light signal in response to reception of the input electric signal;

a terminal resistor arranged in parallel with said optical modulator, having one end electrically connected to said optical modulator and the other end electrically grounded;

a damping resistor arranged in series with said optical modulator, having one end electrically connected to said micro-strip line and the other end electrically connected to a connecting point of said optical modulator and said one end of said terminal resistor respectively; and an inductance disposed between said damping resistor and the connection point of said optical modulator and said one end of said terminal resistor.

15. The optical communications module as claimed in claim 14, further comprising:

a second inductance disposed between the connection point of said optical modulator and said one end of said terminal resistor.

16. The optical communications module as claimed in claim 14, wherein at least said optical modulator, said terminal resistor, said damping resistor and said inductance are arranged in a single package.

17. The optical communications module as claimed in claim 16, wherein said input electric signal is supplied from outside said package.

18. The optical communications module as claimed in claim 16, wherein said input electric signal is generated inside said package.

19. The optical communications module as claimed in claim 14, wherein said optical modulator is integrated into a semiconductor laser diode.

20. The optical communications module as claimed in claim 14, wherein the value of said damping resistor ranges from over 3 Ω to under 25 Ω, the value of said inductance is greater than or equal to 0.1 nH, and the distance between said damping resistor and said optical modulator is less than or equal to 7.5 mm.

21. An optical communications module, comprising:

a micro-strip line for transferring an input electric signal;

an electro-absorption type optical modulator coupled to receive the input electric signal, for modulating a light signal in response to reception of the input electric signal;

a terminal resistor having one end electrically connected to said optical modulator and the other end electrically grounded;

a damping resistor arranged in series with said optical modulator to compensate for a reduction in impedance at a low frequency of said optical modulator, said damping resistor having one end electrically connected to said micro-strip line and the other end electrically connected to a connecting point of said optical modulator and said one end of said terminal resistor respectively; and an inductance disposed between said damping resistor and the connection point of said optical modulator and said one end of said terminal resistor.

22. The optical communications module as claimed in claim 21, wherein the value of said damping resistor ranges from over 3 Ω to under 25 Ω, the value of said inductance is greater than or equal to 0.1 nH, and the distance between said damping resistor and said optical modulator is less than or equal to 7.5 mm.

* * * * *